June 12, 1945. G. A. BRUESKE 2,378,354
RANGE FINDER
Filed Dec. 30, 1943 2 Sheets-Sheet 1
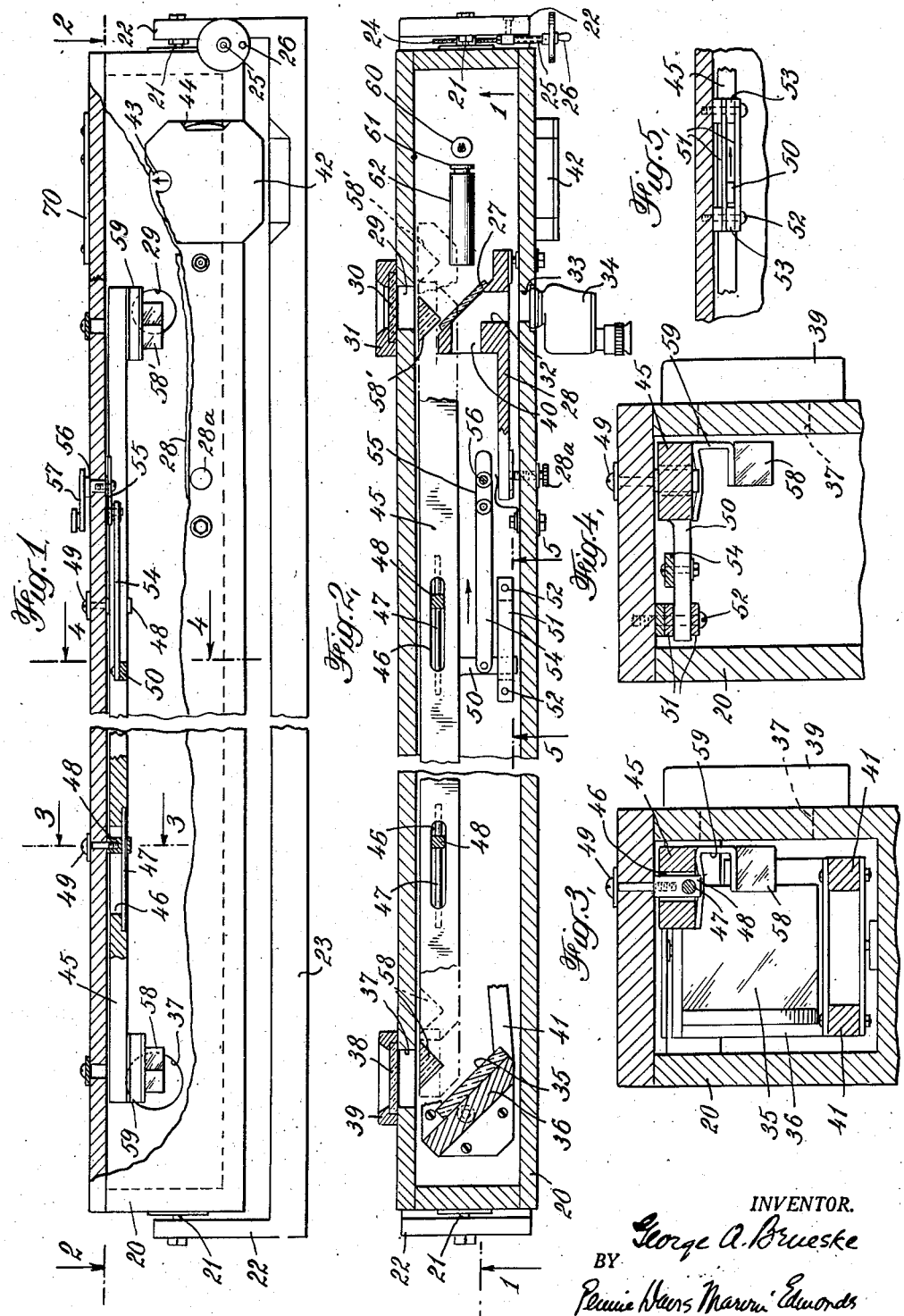
INVENTOR.
George A. Brueske
BY
Pennie Davis Marvin Edmonds
ATTORNEYS

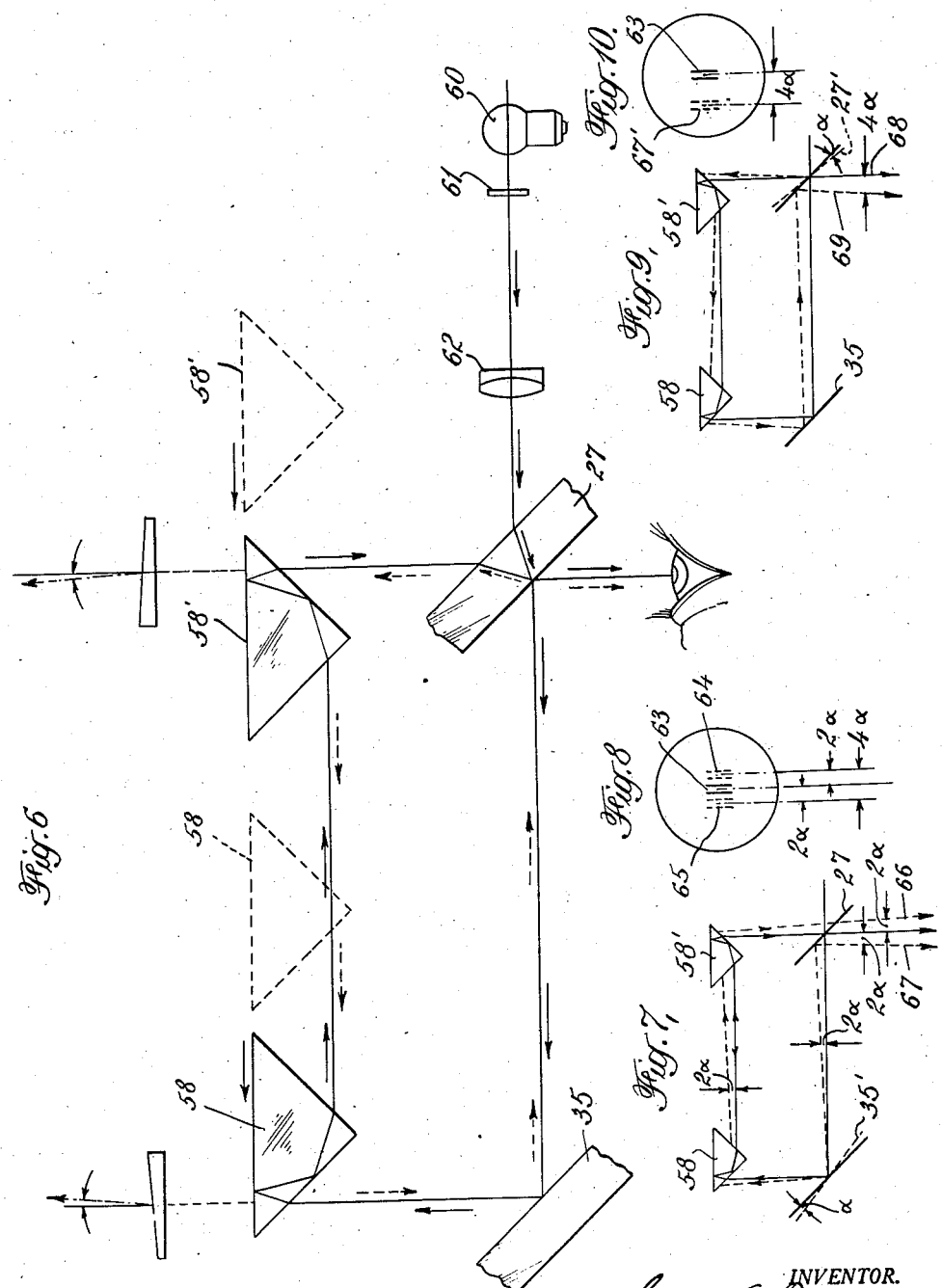

Patented June 12, 1945

2,378,354

UNITED STATES PATENT OFFICE 2,378,354

RANGE FINDER

George A. Brueske, Wayzata, Minn., assignor to The Perkin-Elmer Corporation, Glenbrook, Conn., a corporation of New York Application December 30, 1943, Serial No. 516,230

8 Claims. (Cl. 88—2.7)

This invention relates to range finders of the type which includes a fixed and an adjustable optical element, the angular displacement of the second element relative to the first being a measure of the range. More particularly, the invention is concerned with a novel means by the use of which the state of adjustment of such a range finder can be readily and easily determined and any maladjustment corrected in the field. The new adjustment testing device includes a simple structure mounted internally of the instrument, which may be incorporated in the instrument without materially adding to the cost of the latter or complicating its manufacture.

In range finders which include a pair of optical elements, such as reflectors, spaced along a base line with one reflector fixed and the other angularly displaceable, the reflectors are initially so adjusted that, when the instrument is set for any specific range, two images of an object at that range will be visible to the observer and will appear to coincide. So long as this adjustment continues, the original accuracy of the instrument will be maintained, but, in the field, mechanical shocks to which the instrument may be subjected and heating and cooling are liable to cause displacement or deformation of the parts of the instrument sufficient to result in the introduction of errors of significant magnitude. It is, therefore, important that the state of adjustment of such an instrument be determined and any maladjustment corrected before it is put into use.

In the field, objects at known distances are usually not available for testing the performance of a range finder. Accordingly, a number of devices, well known in the art, have been devised for testing range finders and making field adjustments possible. These devices, which are either incorporated in the instrument or placed at moderate distances from it, may be considered as supplying the range finder with an artificial target apparently at a distance, usually infinite, within the range scale of the instrument. This apparent distance is a constant of the adjusting device which is so constructed that there is a reasonably small probability of a change in the constant. With the apparent distance of the artificial target known, the range finder may range upon it as though it were real, and, if the range indicated by the instrument is not correct, an adjustment in the instrument can be made. Thereafter, correct range readings may be made directly on objects at unknown distances. With adjusting devices of the type described, it will be evident, therefore, that the accuracy to be attained in adjusting the instrument can be no better than the accuracy obtained on known targets.

The present invention is directed to the provision in a range finder, which includes two optical elements, one of which is of the beam dividing type, of a novel internal adjustment testing device by means of which field adjustments may be made to greater accuracy than can be achieved with the prior devices, with the result that the overall accuracy of range readings is materially increased. The device includes no intricate parts and it imposes no additional accuracy requirements on parts already incorporated in the range finder. Also, the optical parts of the device need be of no greater accuracy than that prescribed by standard practice in the industry.

The new adjustment testing device includes means movable to and from a position in which they cooperate with the elements of the instrument to establish a closed optical path and means for projecting a beam from a suitable fiducial or reference mark. The projected beam is divided by the beam dividing element of the instrument into two parts which traverse the closed path in opposite directions and ultimately emerge therefrom along substantially parallel paths. The departure of the two parts of the beam from substantial parallelism then serves to indicate that the instrument is out of adjustment. During their travel along the closed path, the two parts of the projected beam are reflected a total of four times. Angular displacement of the elements of the instrument, accordingly, results in a deviation change between the two parts of the projected beam which is four times as great as the angle of displacement, and any maladjustment of the elements can, therefore, be readily detected.

For a better understanding of the invention, reference may be made to the accompanying drawings, in which Fig. 1 is a vertical sectional view on the line 1—1 of Fig. 2 of a range finder equipped with the new adjusting device, certain parts being omitted;

Figs. 2, 3, and 4 are sectional views on the lines 2—2, 3—3, and 4—4, respectively of Fig. 1;

Fig. 5 is a sectional view on the line 5—5 of Fig. 2;

Fig. 6 is a diagrammatic view illustrating the manner in which the adjustment testing device functions;

Fig. 7 is a diagrammatic view showing the path taken by light beams through the device when the elements of the range finder are out of adjustment;

Fig. 8 is a view showing the two images of fiducial marks visible to the observer under the conditions shown in Fig. 7; and Figs. 9 and 10 are views corresponding to Figs. 7 and 8 but illustrating another form of maladjustment of the range finder.

For purposes of explanation, the new adjustment testing device is illustrated in a form suitable for use in a range finder of the construction shown in my copending application Serial No. 516,229, filed December 30, 1943. That range finder includes a casing 20 mounted for rotational movement about a horizontal axis on pivots 21 in standards 22 extending upward from a support 23. The casing is angularly adjustable on the pivots by means of a screw 24 threaded through a nut attached to one end of the casing, the screw being rotatable by a shaft 25 operable by a crank 26 and mounted in a bearing attached to the adjacent standard 22.

A mirror 27 is mounted in the casing on a support 28 and is so secured to the rear wall of the casing that it may be adjusted relatively thereto by means which include an adjustment screw 28a. Mirror 27 lies opposite an aperture 29 in the front wall of the casing, which is closed by a wedge prism 30 held in place by a cell 31. The mirror is of the beam dividing type and a passage 32 leads through support 28 from the rear surface of the mirror to an opening 33 in the rear wall of the casing. A telescope 34 is mounted on the rear wall of the casing to receive light which enters the casing through aperture 29 and passes through mirror 27 and passage 32.

A second mirror 35 is mounted at the other end of the casing on a support 36, which is angularly adjustable about a vertical axis, and this mirror lies opposite an aperture 37 through the front wall of the casing, which is closed by a wedge prism 38 held in place by a cell 39. A light beam entering the casing through prism 38 and striking mirror 35 is reflected lengthwise of the casing and enters a passage 40 in support 28 to strike the rear face of mirror 27 and be reflected thereby into the telescope.

The angular position of support 36 for mirror 35 is adjustable means of a lever which is attached to support 36 and extends lengthwise of the casing past support 28. This lever, shown in detail in my copending application above identified, includes a pair of longitudinal elements, of which one is indicated at 41. The angular position of support 36 and its mirror 35 is adjusted by swinging the lever and, for this purpose, the end of the lever remote from the support is acted on by suitable means not shown, which are operable by a dial mounted within a housing 42 attached to the rear face of the casing adjacent the telescope. The dial carries marks indicating the range and visible through an opening 43 in the face of housing 42, and the edge of the dial is accessible through an opening 44 in the side wall of housing 42, in order that the dial may be turned to adjust the position of support 36 and mirror 35.

In the use of the range finder, one beam of light from the object at the unknown range enters the casing through prism 30 and passes through mirror 27 into the telescope, while another beam enters through prism 38 to strike mirror 35 and be reflected therefrom upon the rear face of mirror 27 from which it is reflected into the telescope. The observer, accordingly, sees two images of the object produced by the two light beams and, when mirrors 35 and 27 are in proper relation, the two images coincide. If the instrument is in proper adjustment, the mark then visible on the dial gives the correct range of the object. If the correct range does not appear on the dial, the instrument is out of adjustment and the adjustment may be restored by setting the dial to the correct reading and adjusting mirror 27 until the images coincide. The precision with which mirrors 27 and 35 are placed in their proper relative positions to effect coincidence of the two images at a known range constitutes the problem of the adjustment.

The means for testing the state of adjustment of the instrument includes a bar 45 which is mounted on the top wall of the casing 20 parallel to the longitudinal axis of the instrument and is movable endwise. The bar is provided with slots 46 and a rod 47 is mounted lengthwise in each slot. Each rod passes through an opening in a stud 48 secured against the under surface of the top of the casing by a screw 49 passing through the casing wall. The bar is provided with a laterally extending arm 50, the free end of which lies between spaced upper and lower plates 51 attached to the under surface of the top wall of the casing by screws 52, the plates being spaced from one another and from the casing wall by washers 53 on the screws. The mounting of the arm as described prevents the bar from rotating. The means for moving the bar endwise operates on the arm and such means includes a link 54 connected to a crank 55 on a shaft 56 extending through the top wall of the casing. A crank 57 on the exposed end of the shaft is operable to rotate the shaft to move arm 50 and bar 45 lengthwise of the casing.

A pair of reflecting elements 58, 58' or prisms of the 90° constant deviation type are mounted on brackets 59 secured to the under surface of the bar and these elements are spaced apart a distance corresponding to the spacing of the mirrors 27 and 35. When the bar 45 is in operative position, the prisms lie in such relation to the mirrors as to cooperate therewith to establish a closed optical path and when bar 45 is retracted to inoperative position, the prisms are displaced relative to their mirrors so as not to interfere with the normal use of the instrument. An incandescent lamp bulb 60 is mounted in the casing on an extension of the base line and this lamp, which is supplied with current in any suitable way, serves as a source of illumination for a reticule 61 disposed on the base line. The lamp is preferably automatically turned on or off by a switch, not shown, which is actuated by the bar 45 as the latter moves to and from operative position. A lens 62 serving as a collimator, lies on the base line between the reticule and mirror 27.

In the use of the new device for testing the adjustment of the range finder, the instrument is set for the contant range of the adjuster and bar 45 is moved endwise in the casing by crank 57 to bring the prisms 58, 58' into operative relation to mirrors 27 and 35. With the device in this position, the lamp 60 is automatically illuminated and a beam from suitable fiducial marks in the reticule is projected through the beam dividing mirror 27. As illustrated by the solid and dotted arrows in Fig. 6, the projected beam is divided at the rear face of mirror 27 into two parts, one of which passes to mirror 35 to be reflected thereby to the prism 58. In this prism, the beam is turned through 90° and passes to prism 58', where it is again turned and passes to mirror 27 through which it is transmitted into telescope 34. The second part of the beam projected on mirror 27 is reflected from the rear surface thereof and travels to prism 58' where it is turned through 90° and directed to prism 58. In its passage through prism 58, the beam is turned through 90° and projected upon mirror 35 from which it is reflected to the rear surface of mirror 27 and is thence reflected into the telescope.

When the range finder is in proper adjustment, the two parts of the beam projected upon mirror 27 and traversing the closed optical path in opposite directions enter the telescope along parallel paths and the two images of the fiducial marks coincide in the field, as indicated in Fig. 8 by the solid lines 63. If the range finder is out of adjustment, the parts of the projected beam entering the telescope will not be parallel and the two images of the fiducial marks will be seen by the observer as out of coincidence, as shown by the dotted lines 64, 65 in Fig. 8.

The effect of maladjustment of mirror 35 is illustrated in Fig. 7, in which the mirror is indicated at 35' as out of adjustment by an angle α. With the mirror so displaced, each of the beams traversing the closed optical path will be displaced by an angle of 2α so that when the beams 66, 67 pass from mirror 27 into the telescope, they will make an angle of 4α with one another. As a result, the images 64, 65 of the fiducial marks visible to the observer will not be in coincidence but will lie displaced on opposite sides of their normal position.

If mirror 27 is displaced by an angle α to the dotted line position 27' (Fig. 9), the part 68 of the beam which travels through the closed optical path in a clockwise direction will be substantially unaffected and the image of the fiducial marks projected thereby into the telescope will coincide with their normal position. That part 69 of the beam which traverses the path in a counterclockwise direction and is twice reflected from the maladjusted mirror, will enter the telescope out of parallelism with beam 68 by an angle 4α and the image 67' projected thereby will be seen as displaced by an angle 4α.

It is to be noted that the angle in space between the two mirrors is the quantity that is checked by the adjuster. This angle, in practice, is the resultant of two individual small displacements of the mirrors.

When the adjustment testing device shows that the range finder is out of adjustment, the normally fixed mirror 27 is angularly displaced by adjustment of its locating points until the images of the fiducial marks visible in the field of the telescope are in coincidence. After the adjustment of the instrument has been made and any maladjustment corrected, the bar carrying the prisms 58, 58' is retracted by turning crank 57 to place the prisms in inoperative position and the instrument may thereafter be employed in the usual manner. For the purpose of providing access to the prisms, the collimator system, and the lamp, the top of the casing is provided with suitable openings normally closed by plates, such as that indicated at 70.

It will be apparent from the foregoing that the new adjuster is superior to prior devices for the same purpose in that it makes possible greater accuracy of adjustment. Range finders of the two reflector type present both reflectors to one of the beams from the adjusting devices previously used, so that an angular change in the relative positions of the reflectors will cause the twice reflected beam to be deviated through twice the angular alteration of the reflectors. In such a range finder equipped with the new adjuster, the two beams traversing the system are reflected a total of four times, so that an angular change in the relative positions of the two reflectors results in a four fold deviation change between the beams. As this relative change in direction of the beams is the criterion for adjustment of the range finder in each case, it will be apparent that a small maladjustment can be more readily detected by the new adjuster than by prior devices.

The wedge-prisms 30 and 38 provide a means for adjusting the range constant of the internal adjusting system to any desired position on the range scale so that manufacturing tolerances of the angles of the constant deviation prisms 58, 58' may be compensated for.

I claim:

1. In a range finder which includes a casing containing a fixed and an angularly adjustable reflector spaced along a base line, one of the reflectors being of the beam dividing type and the angular displacement of the adjustable reflector being a measure of the range, an adjuster system which comprises a bar mounted for endwise movement within the casing along a line parallel to the base line, a pair of reflecting elements mounted on the bar and spaced a distance substantially the same as the spacing of the reflectors, means for moving the bar to and from a position in which the reflecting elements cooperate with the reflectors to establish a closed optical path, and means for projecting the image of a fiducial mark along the base line through the beam dividing reflector to be thereby divided into two parts which traverse the path in opposite directions and then emerge along substantially parallel paths.

2. In a range finder having a fixed and an adjustable reflector spaced along a base line, one of the reflectors being of the beam dividing type, a telescope in which two images of an object at the unknown distance are visible, and means for angularly displacing the adjustable reflector to bring the two images into coincidence, such displacement being a measure of the range, an internal adjuster system which comprises a mounting, a pair of reflectors secured in fixed relation on the mounting, means for moving the mounting to and from a position in which the reflectors cooperate with the range finder reflectors to form a closed optical path, and means for projecting an image of a fiducial mark through the beam dividing reflector to be divided therein into two parts which traverse the closed path in opposite directions and are recombined at said reflector and emerge along substantially parallel paths into the telescope.

3. In a range finder having a fixed and an adjustable reflector spaced along a base line, one of the reflectors being of the beam dividing type, a telescope in which two images of an object at the unknown distance are visible, and means for angularly displacing the adjustable reflector to bring the two images into coincidence, such displacement being a measure of the range, an internal adjuster system which comprises a mounting, a pair of reflectors secured in fixed relation on the mounting, means for moving the mounting along a line parallel to the base line to and from a position in which the reflectors cooperate with the range finder reflectors to form a closed optical path, and means for projecting an image of a fiducial mark through the beam dividing reflector to be divided therein into two parts which traverse the closed path in opposite directions and are recombined at said reflector and emerge along substantially parallel paths into the telescope.

4. In a range finder having a fixed and an adjustable reflector spaced along a base line, one of the reflectors being of the beam dividing type, a telescope in which two images of an object at the unknown distance are visible, and means for angularly displacing the adjustable reflector to bring the two images into coincidence, such displacement being a measure of the range, an internal adjuster system which comprises a bar lying parallel to the base line, a pair of reflectors secured in fixed relation on the bar with a spacing substantially that of the spacing between the reflectors of the range finder, means for moving the bar endwise to and from a position in which the reflectors cooperate with the range finder reflectors to form a closed optical path, and means for projecting an image of a fiducial mark through the beam dividing reflector to be divided therein into two parts which traverse the closed path in opposite directions and are recombined at said reflector and emerge along substantially parallel paths into the telescope.

5. In a range finder having a fixed and an adjustable reflector spaced along a base line, one of the reflectors being of the beam dividing type, a telescope in which two images of an object at the unknown distance are visible, and means for angularly displacing the adjustable reflector to bring the two images into coincidence, such displacement being a measure of the range, an internal adjuster system which comprises a mounting, a pair of reflecting elements of the constant deviation type secured in fixed relation to the mounting, means for moving the mounting to and from a position in which the reflecting elements cooperate with the reflectors to form a closed optical path, and means for projecting an image of a fiducial mark through the beam dividing reflector to be divided therein into two parts which traverse the closed path in opposite directions and are recombined at said reflector and emerge along substantially parallel paths into the telescope.

6. A range finder and associated adjuster system, which comprises a pair of reflectors spaced along a base line, one of the reflectors being of the beam dividing type, a mounting, a pair of reflectors secured in fixed relation to the mounting, means for moving the mounting to and from a position in which the reflectors thereon cooperate with the other reflectors to form a closed optical path, means for projecting the image of a fiducial mark along the base line upon the beam dividing reflector, the projected beam being thereby divided into two parts traversing the path in opposite directions and thereafter rendered substantially parallel by said beam dividing reflector, and means in which the parts of the beam finally emergent from the beam dividing reflector are received and the partial images of the mark may be compared.

7. A range finder and associated adjuster system, which comprises a pair of reflectors spaced along a base line, one of the reflectors being of the beam dividing type, a mounting extending along a line parallel to the base line, a pair of reflecting elements of the constant deviation type secured in fixed relation on the mounting, means for moving the mounting endwise to and from a position in which the reflecting elements thereon cooperate with the reflectors to form a closed optical path, means for projecting the image of a fiducial mark along the base line upon the beam dividing reflector, the projected beam being thereby divided into two parts traversing the path in opposite directions and thereafter emerging from said reflector along substantially parallel paths, and means in which the parts of the beam finally emergent from the beam dividing reflector are received and the two images of the mark may be compared.

8. In a range finder which includes a casing containing a fixed and an angularly adjustable reflector spaced along a base line, one of the reflectors being of the beam dividing type and the angular displacement of the adjustable reflector being a measure of the range, an adjuster system which comprises a bar mounted within the casing with its longitudinal axis parallel to the base line, a pair of reflecting elements mounted on the bar, the bar being movable endwise to and from a position in which the reflecting elements cooperate with the reflectors to establish a closed optical path, means within the casing for projecting the image of a fiducial mark along the base line upon the beam dividing reflector, the projected beam being thereby divided into two parts traversing the path in opposite directions and emerging from said reflector along substantially parallel paths, and means operable from outside the casing for moving the bar.

GEORGE A. BRUESKE.